United States Patent [19]

Chiba et al.

[11] 4,435,000
[45] Mar. 6, 1984

[54] SEATBELT TIGHTENING DEVICE

[75] Inventors: Masakazu Chiba; Fumio Matsuoka, both of Susono, Japan

[73] Assignee: Toyota Jidosha Kogyo Kabushiki Kaisha, Toyota, Japan

[21] Appl. No.: 391,714

[22] Filed: Jun. 24, 1982

[30] Foreign Application Priority Data

Aug. 31, 1981 [JP] Japan .................. 56-129422[U]

[51] Int. Cl.³ .............................................. B60R 21/10
[52] U.S. Cl. ...................................... 280/806; 297/480
[58] Field of Search ............... 280/801, 802, 805, 806, 280/807, 808; 297/468, 470, 480

[56] References Cited

U.S. PATENT DOCUMENTS 4,008,780  2/1977  Bendler et al. ............... 280/806
4,201,418  5/1980  Reidelbach et al. .......... 280/805
4,232,886  11/1980  Tsuge et al. ................. 280/806
4,237,690  12/1980  Tsuge et al. ................. 280/806

Primary Examiner—Joseph F. Peters, Jr.
Assistant Examiner—Ross Weaver
Attorney, Agent, or Firm—Parkhurst & Oliff

[57] ABSTRACT

A seatbelt tightening device for tightening a seatbelt and removing a sag therefrom in a collision of a motor vehicle, characterized by a rod connected thereto with one end of a seatbelt, a spring for biasing the rod in a direction of tightening the seatbelt, a locking wire for drawing and restraining the rod or spring to a stand-by position against the biasing force of the spring, and means including an electric power source and a collision sensor, for heating and fusion-cutting the locking wire by a current passage from the power source when the collision sensor is turned "ON".

6 Claims, 3 Drawing Figures

SEATBELT TIGHTENING DEVICE

BACKGROUND OF THE INVENTION

1. Field of the Invention

This invention relates to improvements in a seatbelt tightening device wherein a seatbelt is tightened to remove a sag therefrom in a collision of a motor vehicle.

2. Description of the Prior Art

In general, a seatbelt for restraining an occupant in a collision or the like of a motor vehicle is adapted to lock the seatbelt by an emergency lock device in a collision, to thereby prevent the seatbelt from being unwound. However, if there is a sag in the seatbelt in a locked state of the seatbelt, then the effect of restraining the occupant by the seatbelt is diminished.

As a means for removing a sag from the seatbelt; a seatbelt tightening device for tightening the seatbelt in a collision of a motor vehicle is proposed. There is proposed such a seatbelt tightening system, which uses a restoring force of a spring for example, that the spring in a compressed state is adapted to be released by a trigger mechanism for sensing a change in acceleration such as a pendulum. However, there have been presented the disadvantage that it takes a long time from an occurrence of a collision to completion of operation of the trigger mechanism, whereby the timing of tightening the seatbelt tends to be delayed. Further, there has been proposed one in which the device is engaged with a moving body such as a body of rotation under a frictional force, to thereby tighten the seatbelt. However, there has been presented the disadvantage of low reliability.

SUMMARY OF THE INVENTION

It is therefore the primary object of the present invention to provide a seatbelt tightening device wherein reliable operation is obtained and an operating time of a trigger mechanism is short.

To achieve the above-described object, according to the present invention, in a seatbelt tightening device for tightening a seatbelt and removing a sag therefrom in a collision of a motor vehicle, the device comprises a rod connected thereto with one end of a seatbelt; a spring for biasing the rod in a direction of tightening the seatbelt; a locking wire for drawing and restraining the rod or spring to stand-by position against the biasing force of the spring, and means including an electric power source and a collision sensor, for heating and fusion-cutting the locking wire by a current passage from the power source when the collision sensor is turned "ON".

Further, to achieve the above-described object, according to the present invention, in the aforesaid seatbelt tightening device, a lever for imparting the biasing force of the spring from the rod to the locking wire is provided between the rod and the locking wire.

Further, to achieve the above-described object, according to the present invention, in the aforesaid seatbelt tightening device, the lever is oscillatingly supported in a balance-like manner, engaged at one end thereof with the rod, and connected at the other end thereof to the locking wire.

Further, to achieve the above-described object, according to the present invention, in the aforesaid seatbelt tightening device, a distance between a fulcrum of oscillation of the lever and the rod is made smaller than a distance between the fulcrum of oscillation and the locking wire.

Further, to achieve the above-described object, according to the present invention, in the aforesaid seatbelt tightening device, the locking wire is made of a material which can be readily fusion-cut by heat for a short period of time such as a resin, and the means for heating and fusion-cutting is formed of a heater wound around the locking wire, respectively.

Further, to achieve the above-described object, according to the present invention, in the aforesaid seatbelt tightening device, the locking wire is made of a material to be heated by a current passage flowing therethrough and fusion-cut by itself.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of an embodiment of the present invention with reference to the drawings.

Figure 1:
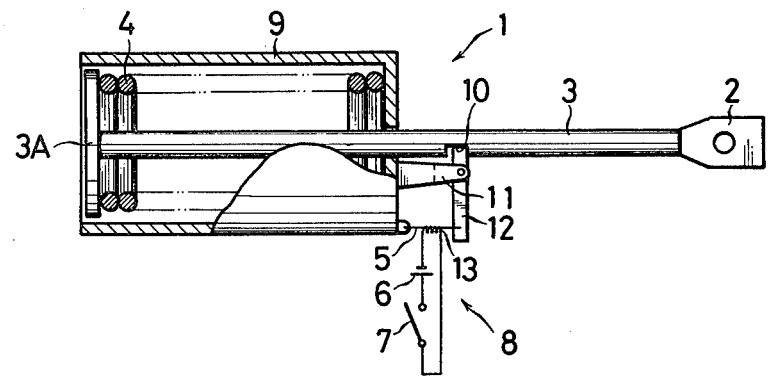
FIGS. 1 and 2 are sectional views showing an embodiment of the seatbelt tightening device according to the present invention, partially including a circuit diagram.
Figure 2:
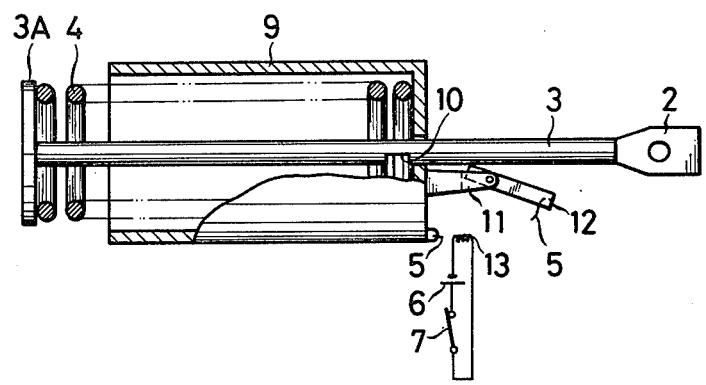

In the first embodiment of the present invention, as shown in FIGS. 1 and 2, a seatbelt tightening device 1 comprises a rod 3 connected to one end of a seatbelt, not shown, through a joint 2, a spring 4 for biasing the rod 3 in a direction of tightening the seatbelt, i.e., to the left in FIG. 1, a locking wire 5 for drawing and restraining the rod 3 to a stand-by position (the state in FIG. 1) against the spring 4, and means 8 including an electric power source 6 and a collision sensor 7, for heating and fusion-cutting the aforesaid locking wire by a current passage from the power source 6 when the collision sensor 7 is turned "ON".

The aforesaid spring 4 is a compression coil spring and confined between a flange portion 3A formed at the forward end of the rod 3 and the inner rear end face of a cylinder 9 in the cylinder 9, to thereby bias the rod 3 in a direction of the forward end thereof. The aforesaid cylinder 9 is open at the forward end thereof, so that the flange portion 3A can project forward.

A locking cutout 10 is formed at the side surface of the substantially central portion in the longitudinal direction of the aforesaid rod 3, and one end of a lever 12 oscillalingly supported in a balance-like manner by a bracket 11 at the outer rear end of the cylinder 9.

The other end of this lever 12 is connected to the outer rear end of the cylinder 9 by the aforesaid locking wire 5, to thereby constitute a trigger mechanism in which the rod 3 restrains the spring 4 in a compressed state, i.e., a stand-by condition. In the lever 12, one arm on the side of the locking wire is larger in length than the other arm to a point of force on the side of the rod as measured from the bracket 11 as being a fulcrum. With this arrangement, the compressive force of the spring 4 acting on the locking wire 5 is attenuated through the levelage of the lever 12, so that the locking wire 5 may be decreased in strength.

The aforesaid locking wire 5 is made of a material which can be readily fusion-cut by heat for a short period of time such as a resin, and wound thereabout with a heater 13 made of a nichrome wire or the like.

This heater 13 constitutes a series circuit in cooperation with the power source 6 and the collision sensor, and is adapted to generate heat by a current passage from the power source 6 to the heater 13 when the collision sensor is turned "ON".

Description will now be given of action of the above-described embodiment.

When a collision of a motor vehicle occurs, the collision sensor 7 is turned "ON" to close a circuit to the heater 13, whereby the heater 13 generates heat by a current passage from the power source 6, so that the locking wire 5 can be fusion-cut. When the locking wire 5 is fusion-cut, the rod 3 is quickly moved to the left by the restoring force of the spring 4 as shown in FIG. 2 because oscillation of the lever 12 in the counterclockwise direction is allowed, i.e., the locked state of the rod 3 by the lever 12 is released, whereby the seatbelt is tightened, so that a sag can be removed.

Figure 3:
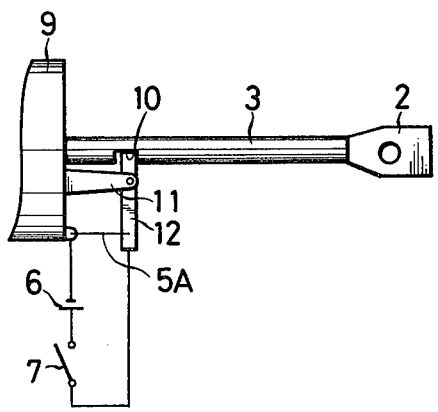
FIG. 3 is a front view showing the essential portions of a second embodiment of the present invention, partially including a circuit diagram.

Description will hereunder be given by a second embodiment of the present invention as shown in FIG. 3.

In this embodiment, a locking wire 5A is made of a material capable of generating heat by a current passage to be easily fusion-cut by a current passage such as a nichrome wire or the like. The arrangement thereof other than the above is identical with that in the first embodiment shown in FIGS. 1 and 2, so that description thereof will be omitted.

In the case of this embodiment, the locking wire 5A additionally functions as the heater 13 in the aforesaid first embodiment, such an advantage can be offered that the parts are reduced in number. However, in the case of this embodiment, insulating materials must be provided at portions where the locking wire 5A is secured to the lever 12 and the cylinder 9.

Additionally, in the above-described embodiment, the locking wire 5 or 5A restrains the rod 3 through the lever 12, but, the locking wire may be anything which can substantially restrain the rod 3, and consequently, the locking wire 5 or 5A may directly restrain the rod 3 or the spring 4.

Furthermore, the spring 4 is a compression spring, however, may be replaced by a tension spring. In this case, the position of mounting the spring is reversed.

Additionally, the power source for fusion-cutting the locking wire 5 or 5A should not necessarily be limited to a battery, but, may be replaced by anything which can supply a current so that the locking wire can be fusion-cut. Consequently, ones including a capacitor, a high tension coil and the like should naturally be covered.

It should be apparent of those skilled in the art that the abovedescribed embodiments are merely representative, which represent the applications of the principles of the present invention. Numerous and varied other arrangements can be readily devised by those skilled in the art without departing from the spirit and the scope of the invention.

What is claimed is:

1. A seatbelt tightening device for tightening a seatbelt and removing a sag therefrom in a collision of a motor vehicle, characterized by a rod connected thereto with one end of a seatbelt, a spring for biasing said rod in a direction of tightening said seatbelt, a locking wire for drawing and restraining said rod or spring to a stand-by position against the biasing force of said spring, and means including an electric power source and a collision sensor, for heating and fusion-cutting said locking wire by a current passage from said power source when said collision sensor is turned "ON".

2. A seatbelt tightening device as set forth in claim 1, characterized in that a lever for imparting the biasing force of said spring from said rod to said locking wire is provided between said rod and said locking wire.

3. A seatbelt tightening device as set forth in claim 2, wherein said lever is oscillatingly supported in a balance-like manner, engaged at one end thereof with said rod, and connected at the other end thereof to said locking wire.

4. A seatbelt tightening device as set forth in claim 3, wherein a distance between a fulcrum of oscillation of said lever and said rod is made smaller than a distance between said fulcrum of oscillation and said locking wire.

5. A seatbelt tightening device as set forth in claim 1, 2, 3 or 4, wherein said locking wire is made of a material which can be readily fusion-cut by heat for a short period of time such as a resin, and said means for heating and fusion-cutting is formed of a heater wound around said locking wire.

6. A seatbelt tightening device as set forth in claim 1, 2, 3 or 4, wherein said locking wire is made of a material to be heated by a current passage flowing therethrough and fusion-cut by itself.

* * * * *